3,297,806
METHOD OF PROTECTING UNSTABLE MATERIALS
Orlando A. Battista, Drexel Hill, and Edwin G. Fleck, Jr., Wallingford, Pa., assignors, by mesne assignments, to FMC Corporation, San Jose, Calif., a corporation of Delaware
No Drawing. Filed Dec. 29, 1961, Ser. No. 163,089
3 Claims. (Cl. 264—129)

This invention relates to the protection or stabilization of unstable chemical substances, particularly oily materials, to the method of protecting them, and to the resulting product. More particularly, it relates to a mixture comprising particles of cellulose crystallite aggregates having the unstable substance sorbed thereon, the mixture being formed in a self-sustaining granular form and being coated with a protective shell.

While the protection of unstable oily materials has been proposed heretofore, resulting in the formation of gel-coated products in subdivided form, the method of making such products, particularly on a large scale, is difficult, requiring close control of the choice of materials, pH, and temperature. Furthermore, the products are limited to microscopic sizes. The present invention involves simple mixing and drying steps, admits of better and less critical control, is operable at room temperature, is capable of being operated on a large scale, and results in an easily handlable product of convenient size, viz., granules whose largest dimension ranges from a fraction of a millimeter to several millimeters.

The invention, briefly, comprises apparently dry, free-flowing granules each made up of a unitary core and an outer shell. The core is a shaped self-sustaining mixture of particles of cellulose crystallite aggregates and an unstable chemical substance, the latter having been sorbed on the particles prior to the shaping of the mixture. The shaping or forming of the mixture is carried out by the use of some pressure, preferably applied by means of a sliding or rolling motion. The shell is a thin, solid coating of a film-forming material, preferably an edible protective colloid. The self-sustaining core, which comprises a backing for the shell, provides the granules with characteristics of apparent dryness and free-flowability, and the shell protects the unstable chemical substance against deterioration or change without impairing these characeristics.

Considering first the general method of making the granules, it comprises mixing particles of the cellulose crystallite aggregates with the unstable chemical substance, shaping and forming the resulting mixture to form self-sustaining granules, and then applying to the granules a film-forming material to film or coat them. Thereafter the coated granules may or may not be dried, and are recovered in an apparently dry free-flowing form.

More particularly, and illustratively considering the invention in connection with the protection of an unstable oil, the method comprises mixing the cellulose crystallite aggregates and the oil in a mixing device in which the particles of the mixture may be rolled or slidingly pressed against concavely curved, preferably circular, surfaces such as the side walls of a round mixing container. Suitably, such an action may be obtained in a conventional Hobart mixer, a device having a paddle-type stirrer which rotates inside a mixing bowl and which may be adjustably spaced from the bowl walls so as to provide a small variable clearance, say 0.1 to 4 or 5 millimeters, between the walls and the outer edges of the stirrer. It will be understood that other suitable devices may be used.

Accordingly to a preferred procedure, water is present in the mixture in an amount of 45 to 75% by weight of the mixture, preferably 55 to 65%, the balance comprising the aggregates and the oil. In another procedure the mixture may comprise 1 to 33% by weight of the oil, 75 to 15% by weight of water, and 25 to 55% by weight of the aggregates, with the sum of the oil and water being above 45%, preferably ranging from 45 to 75% by weight of the mixture. It is also possible, but less preferred, to use an aggregates-oil mixture in which the oil comprises the total liquid in an amount of 1 to 45% by weight of the mixture, the balance of 99 to 55% being the aggregates. Thus, in a broader sense, the mixture may comprise 0 to 75% by weight of water, 1 to 45% of oil, and 99 to 25% of aggregates; when water is employed, the sum of the oil and water should be above 45%.

The concentrations of the core mixtures described in the preceding paragraph apply to unstable substances in general as well as to unstable oils, as will be understood.

Continued mixing of the aggregates-liquid mixture under the foregoing conditions has been found to result in the formation of apparently dry free-flowing cores of a more or less spherical shape. During this operation the liquid is sorbed on the aggregates, i.e., both adsorbed and absorbed, so that it not only coats the surfaces thereof but also is retained in the pores, cracks, fissures, etc. thereof. Mixing times to achieve this result may vary from 2 or 3 minutes to 2 or 3 hours, preferably 30 to 60 minutes. The size of the cores, in terms of their diameter, will correspond to the size of the clearance between the stirrer and the walls of the mixing bowl. It will be observed in this connection that variable clearances may suitably be obtained by employing stirrers of larger or smaller over all diameters.

After formation of the cores, they are dried if water was used in making them, drying being suitably done in air although any other conventional procedure is useful. Drying is of value to better tie up the oil or other unstable substance, the cores tending to become harder and more resistant to mechanical attrition, and also easier to coat by providing a better backing for the coating shell. The cores are then immersed in and mixed with the liquefied coating material, preferably in the form of an aqueous solution, for a time just sufficient to coat them without changing their shape. Generally, a mixing period of 1 to 5 minutes is sufficient to form a coating on the cores, and the resulting coated cores or granules are dried to form the final product. The thickness of the coating may be regulated by varying the concentration of coating material in the solution. If desired, the solution may also be sprayed over the cores before and/or during the mixing step.

Considering the ingredients of the granules in detail, the cellulose crystallite aggregates are products obtained from the controlled acid hydrolysis of cellulose, there being formed an acid-soluble portion and an acid-insoluble portion. The latter comprises a crystalline residue or remainder which is water washed and recovered, being referred to as cellulose crystallite aggregates, or as level-off D.P. (degree of polymerization) cellulose. Preparation of the aggregates is described in Patent Number 2,978,446. It may be observed that "crystallite," as used herein, is a cluster of longitudinally disposed, closely packed cellulose chains or molecules, and that "aggregates" are clusters of crystallites.

The aggregates suitable for use in the invention are characterized by having a preferred average level-off D.P. of 125 to 375, or even 200 to 300, anhydroglucose units. Preferred sources for making such material include cotton linters and wood pulp having a high alpha-cellulose content. Other suitable aggregates may have lower average level-off D.P. values, say in the range of 60 to 125, or even 15 to 60. Crystallite aggregates in the 60 to 125

D.P. range are obtainable from the acid hydrolysis of alkali-swollen natural forms of cellulose, of which a preferred source is cellulose that has been mercerized by treatment with 18% caustic soda solution at 20° C. for two hours. Aggregates in the 15 to 60 D.P. range are suitably prepared from regenerated forms of cellulose, including tire and textile yarns, other regenerated cellulose fibers, and cellophane.

In every case the cellulosic source material has a D.P. greater than the level-off D.P. thereof.

In their as-formed state, the aggregates are characterized by the presence of many cracks in their surfaces, including similar surface irregularities like pores, depressions, voids, fissures, and notches. Because of such irregularities, the sorptive capacity of the aggregates for oils and other liquids is substantial. Also, the apparent or bulk density of the aggregates is much less than their absolute density. In terms of lbs. per cu. ft., the bulk density of the aggregates may range from 7 to 8 to about 34 or 35 lbs. per cu. ft. Their chemical purity is very high, the material comprising at least 95%, preferably at least 97% or 99%, polyglucose, or anhydroglucose units, based on chromatographic analysis. In terms of ash, the aggregates preferably contain less than 100 p.p.m. (parts per million), although ash may range from about 10 to about 400 or 500 or 600 p.p.m. By comparison, conventional fibrous cellulose may have 1000 to 4000 p.p.m. of ash. The as-formed aggregates are further characterized by having a particle size in the overall range of 1 or 2 to 250 to 300 microns, as determined visibly by microscopic examination.

If desired, the aggregates may be mechanically disintegrated as by subjecting them, preferably in the presence of an aqueous medium, to attrition in a mill, or to a high speed cutting action, or to the action of high pressures on the order of at least 5,000 or 10,000 p.s.i. It is preferable, however, to start out with the non-attrited aggregates. It should be noted that attrition of the aggregates takes place in the mixing step, during which they are pressed against the surfaces of the mixing container.

Either before or after mechanical disintegration, the aggregates may be dried or not. For producing the dried aggregates a number of drying procedures are available, including freeze drying, spray drying, drum drying, and drying by solvent displacement, which are preferred procedures.

If desired, the aggregates may be fractionated to obtain fractions of more uniform particle sizes. Fractionation may be accomplished by means of such separation procedures as mechanical sifting, settling in water, or centrifuging, a number of useful fractions being obtainable, including fractions having a particle size of up to 1, 2, 5, 10, 40, 50, 100, etc. microns; also, and as is preferred, fractions of 10 to 100 microns, 50 to 100 microns, 50 to 200 microns, or 100 to 200 microns.

The aggregates per se are bland in taste and odor, are white in color, have a physical appearance similar to starch or flour, and are edible but not nutritious.

The unstable chemical substance is usually an organic material, such as an oil or other oleaginous material that is subject to oxidation, and may or may not be edible. More broadly, however, it may be any substance, organic or inorganic, that is subject to physical or chemical change if not protected.

The type of organic chemical substance or compound to which the procedure is applied is not to be limited by structure or chemical characteristics of the coupounds. They may be liquid, solid, or gaseous. Preferably, as noted, the compounds are those which are subject to deterioration or change by autoxidation, radiation, polymerization, volatilization or other phenomena which are spontaneous or self-occurring such as result from normal storage or exposure to the atmosphere under normal conditions and the like.

More specifically, the unstable substance may be an autoxidizable fatty acid like linoleic or linolenic acids; esters thereof like methyl linolenate, methyl linoleate, etc.; aldehydes like cinnamaldehyde; various fatty acids such as butyric, isobutyric, valeric, isovaleric, capric, pelargonic, undecylenic, lauric, myristic, palmitic and stearic acids. Other suitable substances are vitamins, such as vitamin K, vitamin D, vitamin E, and vitamin A, and including ester and other derivatives of the same; also pharmaceuticals, biologicals, and nutrients in general. Also miscellaneous compounds like quinoline, various sterols like cholesterol.

Other materials include edible fats, oils, shortenings, and materials containing them. More specifically, there may be mentioned vegetable oils like castor, coconut, corn, cottonseed, linseed, olive, peanut, soybean, and tung oils; animal and marine fats and oils like butter, butterflat, cream, lard, oleo oil, oleostearin, tallow fish liver, fish, and whale oils; also like margarine, hydrogenated fats, plastic fats, etc. Other useful oils are the essential oils like cinnamon oil, oil of ginger, peppermint oil, and the like. Still other edible lipid materials are salad and cooking oils, salad dressings, mayonnaise, cheese, milk, eggs and egg yolk, chocolate, peanut butter, etc.

Other classes of unstable substances include mineral oils and waxes which are not usually considered edible; also animal and vegetable waxes; and, in general, oily and wax esters of acids and alcohols. As will be understood, higher melting point materials can be heated to render them more fluid.

Still other compounds are fatty acid esters, particularly monoesters and diesters, of glycol, glycerol, sorbitol, sorbitan, and other substituted polyhydric alcohols; the acid may be a mono-carboxylic aliphatic, saturated or unsaturated, straight or branched chain fatty acid, preferably having from 12 to 18 carbon atoms, such as lauric, oleic, stearic, palmitic, myristic, etc. Also sodium salts of fatty alcohol sulfates. Other compounds are the mono- and diesters of sucrose and fatty acids of, preferably, at least 12 carbon atoms.

The unstable substance may not only be an oleaginous one, but also aqueous, or mixtures of the two, or one which is neither oleaginous nor aqueous, such as an organic liquid which is unstable owing to its volatility. These latter, usually oxygen-containing compounds, comprise aldehydes, alcohols, esters, ketones, ethers, organic acids, phenols, etc., and are widely used as flavors. Specific examples include citral, citronellal, 2-hexenal, isobutyraldehyde, laurine, geraniol, n-octyl alcohol, lauryl alcohol, folione, n-butyl acetate, n-butyl isovalerate, inalyl acetate, ethyl butyrate, ethyl propionate, n-decyl acetate, guaiyl acetate, geranyl acetate, ethyl acetate, ethyl caproate, ethyl pelargonate, diacetyl, gamma-n-amyl-butyrolactone, cinnamic aldehyde, 2-furfuraldehyde, vanillin, benzaldehyde, phenylpropyl alcohol, cinnamic alcohol, phenylacetic acid, alpha-irisone, anethol, methyleugenol, para-cresyl acetate, methyl benzoate, hexylsalicylate, furfuryl acetate, ethyl anthranilate, ethyl benzoate, cinnamyl acetate, euganol, etc. Other compounds are aliphatic and alicyclic hydrocarbons, such as terpenes, and aromatic hydrocarbons. Many of the foregoing compounds occur naturally as constituents of oily mixtures, e.g., essential oils.

As indicated, the physical state of the materials is variable; some are solids of varying hardness, some are semi-solid or plastic, some are in the form of pastes, some are viscous liquids, some are less viscous liquids, some are easily volatile like acetaldehyde, some are gaseous like carbon dioxide.

The film-forming material is a normally solid material and is preferably a protective colloid, such as a natural or synthetic gum, but may also include cellulosic materials, proteins, and other materials having film-forming properties. The gums include tree, pod, and shrub exudations like gum tragacanth, gum acacia, gum arabic, gum ghatti, gym karaya, gum okra, and guar gum; seaweed colloids such as agar, carrageen, alginate, and alginate derivatives; seed extracts such as locus bean, quince and guar; amylopectin, starches, and starch derivatives like gelatinized and extrinized starches, and other converted starches; pectins such as apple pectin and citrus pectin; and modified pectins such as low methoxy pectins. Animal colloids or gums like gelatin, sodium caseinate, egg white, egg yolk, whole egg, soluble whey proteins from milk, etc. are suitable. Other protein materials are gluten, isolated soy proteins including partially degraded soy proteins, and albumen.

Conventional modified celluloses are a useful class, some examples of which are sodium carboxymethyl cellulose (CMC), sodium carboxyethyl cellulose, sodium hydroxymethyl cellulose, sodium hydroxyethyl cellulose, hydroxyethy cellulose, methyl cellulose, and ethyl cellulose. Still another class of film formers are the ether derivatives of the cellulose crystallite aggregates, such as the hydroxypropyl and sodium carboxymethyl derivatives, and including those set forth in copending application Ser. No. 2,134, filed January 13, 1960. Also ester and oxidation derivatives of the cellulose crystallite aggregates as disclosed in Ser. Nos. 2,135 and 2,133, both filed on January 13, 1960. The oxidation derivatives include the carboxyl and the aldehyde derivatives of the aggregates; the ester derivatives comprise the phosphate, sulfate, acetate, propionate, and others. With respect to the cellulose and crystallite aggregates derivatives, these preferably have a D.S. (degree of substitution) of about 0.1 to about 1.5, and in some cases even higher.

Another class of colloids are the alginates and derivatives thereof, including alkali metal salt derivatives such as the sodium, potassium, and ammonium salts, and glycol derivatives, such as propylene glycol alginate. Other suitable derivatives are sodium phosphoalginate, made from alginic acid incorporating trisodium phosphate, and magnesium alginate. These compounds are available in fine mesh, water soluble form.

The film-forming materials are all dispersible in water, some being water soluble. Some have surface active properties. The preferred materials are those which are water soluble and edible. If desired, and where possible, organic solvents of relatively low boiling point may be used to dissolve them, preferably low molecular weight aliphatic oxygen-containing compounds, including hydroxy, keto, and alkoxy compounds, as illustrated by methanol, ethanol, propanol, isopropanol, butanol, methylethylketone, acetone, dioxane. Meltable film formers may be applied in melted form to the cores. Mixtures of two or more film-formers are useful. As indicated, the granular product of the method comprises an inner portion or core encased within an outer shell. The product is dry to the eye and touch, and this is true even when the unstable material is a liquid and the aggregates are saturated by it. It will be understood that the drying effect is achieved, at least in part, by virtue of the sorption, i.e., absorption and/or adsorption, of the liquid on the aggregates and within the pores, voids, notches, etc. thereof. The liquid is so well sorbed that the mix, whether in shaped spherical form or loose powdered form, looks and flows as if it were dry; the expression "apparently dry" is intended to describe the foregoing state of the mix. The cores, or uncoated mixtures of aggregates and unstable material, are not mechanically separable into their components, owing to their shaped form and to the fact, as noted, that the unstable material is held by the aggregates by both absorptive and adsorptive forces.

The size of the granules, by which is meant the largest dimension, may range from a fraction of a millimeter, say about 0.1 mm., up to 2, 3, 4, or 5 mm. or more. In their preferred form the granules have a more or less spherical shape so that the foregoing sizes are to be understood as referring to their diameters. It is also to be understood that the term "granules" includes both regular and irregular shapes, of which the regular shapes, such as spheroid, ellipsoid, and the like, are preferred. The dried granules may be conveniently handled and stored, and are freely flowable, it having been found that they exhibit no tendency to stick together.

As indicated in the example, the granules are effective to protect an unstable material against oxidation on standing in atmosphere at room temperatures or even higher. They are of value to confine volatile compounds against loss by evaporation; to prevent medicinal substances from being tasted when swallowed; and in similar protective applications.

The unstable substance is recoverable from the granules as by simple grinding and extraction with a suitable solvent, after which the solvent may be evaporated away. If desired, the protective coating may be dissolved away first, as by means of water or other solvent. In many instances, however, the granules may be used as such, without necessity for separating the unstable substance.

The preservation of the qualities of an unstable material may be utilized during processing, handling and storing of the material before final use. The stabilizing procedure may be applied to bulk materials subject to undesirable chemical and physical changes, and it is also applicable on a small scale when the stabilization of some ingredient admixed with bulk material is desired.

The invention may be illustrated by the following example.

*Example*

Cellulose crystallite aggregates were prepared by hydrolyzing Ketchikan sulfite wood pulp in a 0.5% aqueous HCl solution for 20 minutes at 200° F., after which the temperature was slowly raised over a period of 55 minutes to 265° F. and then maintained at the latter temperature for an additional period of 35 minutes. The temperature throughout the hydrolysis was maintained at about 23 p.s.i.g. The aggregates were spray dried to a water content of 2 to 4% by weight and had an average level-off D.P. of 215 to 240.

About 250 g. of the dried aggregates were taken and mixed with 100 g. of linseed oil and 240 g. of water in a Model N-50 variable speed Hobart mixer equipped with a rotatable paddle or beater attachment disposed in a mixing bowl so that the outermost edges of the beater were spaced about 1 mm. from the sides of the bowl. More particularly, the beater comprised a stem having a plurality of spaced arms extending angularly downwardly from opposite sides of the stem, and a substantially V-shaped member connected the outer ends of the arms; in effect, the beater resembled an inverted tree. The beater had a compound action: it revolved inside the bowl, and it rotated on its axis, the direction of rotation being opposite the direction of its movement around the bowl. After mixing for about 75 minutes, the mixture assumed the form of balls or spheres of about 1 mm. diameter. These shaped spheres were self-sustaining in that they retained their form on further mixing and on handling. The mass of spheres were divided into two equal portions, and each was spread out on the bench top and allowed to dry in air overnight. A third portion, of equal weight as the other two, was also prepared, except that it was not formed into spheres; instead, mixing of the aggregates, oil, and water in the Hobart was carried out only to the point where the mix was in the form of an apparently dry powder. One of the balled portions was mixed with an aqueous solution of gum arabic (100 g. of water plus 10 g. of gum) in a Hobart mixer for 2 to 3 minutes at a low speed in order to coat the balls with the solution. The other balled portion and the powdered portion were used as controls. All portions were exposed to air for a period of 22 days after which the extent of oxidation of the linseed oil was measured by the peroxide test performed according to the Wheeler method described in "Rancidity in Edible Fats" by C. H. Lea, page 108, 1st Ed., 1939, Chem. Publ. Co., Inc., New York, N.Y. The following results were obtained and are expressed as millimoles of peroxide per kilogram of oil:

No.
1 Linseed oil, prior to exposure _____ 7.5
2 Linseed oil, after exposure _____ 478
3 Uncoated powdered mix of aggregates and oil __ 604
4 Uncoated spheres of aggregates and oil _____ 463
5 Coated spheres of aggregates and oil _____ 343

As is apparent, No. 5 had a substantial measure of protection for the oil by comparison with the other exposed samples (Nos. 2, 3, and 4). In addition, No. 5 had the least noticeable odor of rancidity of the exposed samples.

While the invention as described comprises the formation of shaped cores from the aggregates and the unstable material, followed by application of the protective shell to form the granules, it is also applicable to the protective coating of particles of the aggregates while in contact with the unstable material. In other words, while it is preferred to first form a shaped self-sustaining core and then apply the shell, formation of the self-sustaining core may be omitted; instead, each granule may be formed from an inner portion coated with the protective shell; and such inner portion may comprise one or more particles of aggregates mixed with the unstable material so that the latter is sorbed on the particles, and the inner portion so formed may be coated with the protective shell as by means of a pan-tumbling procedure wherein particles of small size, i.e., going down to 1 micron and below, may have a protective shell applied thereto.

Although the invention has been described in connection with specific embodiments of the same, it will be understood that it is capable of obvious variations without departing from its scope.

In the light of the foregoing description, the following is claimed.

1. A method of protecting unstable organic substances from the atmosphere which comprises mixing a liquid comprising the unstable substance with cellulose crystallite aggregates to sorb the unstable substance on the cellulose crystallite aggregates, slidingly pressing and shaping the resulting mixture to form self-sustaining, spherically shaped, free-flowing cores, dry-appearing cores, mixing the cores with a liquid containing an organic film-forming material to sorb the film-forming material on the cellulose crystallite aggregates and to form free-flowing, coated, stable, dry appearing granules.

2. A method of protecting an unstable organic oleaginous substance from the atmosphere which comprises mixing a liquid comprising the unstable substance with cellulose crystallite aggregates in the presence of water to sorb the unstable substance on the cellulose crystallite aggregates, the unstable substance being present in a proportion of from 1% to 45% by weight of the mixture, the cellulose crystallite aggregates being present in a proportion of from 25% to 95% by weight of the mixture and the water being present in a proportion of up to 75% by weight of the mixture, the sum of the proportion of the water and unstable oleaginous substance being at least 45% by weight, slidingly pressing and shaping the resulting mixture to form self-sustaining, spherically shaped, free-flowing, dry appearing cores, drying the cores to harden the same, mixing the hardened cores with an aqueous solution of a film-forming protective colloid, and drying the coated cores to form free-flowing, coated, stable, dry appearing granules.

3. A method of protecting an unstable organic oleaginous substance that is liquid at normal room temperatures which comprises mixing the unstable oleaginous substance with cellulose crystallite aggregates in the presence of water to sorb the unstable oleaginous substance on the cellulose crystallite aggregates, the unstable oleaginous substance being present in a proportion of from 1% to 45% by weight of the mixture, the cellulose crystallite aggregates being present in a proportion of from 25% to 99% by weight of the mixture and the water being present in a proportion up to 75% by weight of the mixture, the sum of the proportion of water and oleaginous liquid being at least 45% by weight, slidingly pressing and shaping the resulting mixture to form self-sustaining, spherically shaped, free-flowing, dry appearing cores, drying the cores to harden the same, mixing the hardened cores with an aqueous solution of a film-forming protective colloid to sorb the film-forming material on the hardened cores and drying the coated cores to form free-flowing, coated, stable, dry appearing granules.

References Cited by the Examiner

UNITED STATES PATENTS

| | | | |
|---|---|---|---|
| 2,849,319 | 8/1958 | Weinmann et al. | 99—169 |
| 2,864,707 | 12/1958 | Toulmin | 99—166 |
| 2,868,646 | 1/1959 | Schapiro | 99—166 XR |
| 3,023,104 | 2/1962 | Battista | 99—1 |
| 3,026,568 | 3/1962 | Moar | 18—47.2 |
| 3,036,338 | 5/1962 | Nack | 18—47.2 |
| 3,096,248 | 7/1963 | Rudzki | 117—100 XR |
| 3,148,123 | 9/1964 | Werner | 99—166 XR |

ROBERT F. WHITE, *Primary Examiner.*

ABRAHAM WINKELSTEIN, *Examiner.*

R. S. AULL, J. A. FINLAYSON, *Assistant Examiner.*